(No Model.) 2 Sheets—Sheet 1.

R. D. WEAVER.
CENTRIFUGAL MACHINE.

No. 475,225. Patented May 17, 1892.

WITNESSES:
D. A. Taubenschmidt
H. B. Reinohl

INVENTOR
R. D. Weaver
BY
Johnston & Reinohl
ATTORNEYS (No Model.) 2 Sheets—Sheet 2.
R. D. WEAVER.
CENTRIFUGAL MACHINE.
No. 475,225. Patented May 17, 1892.
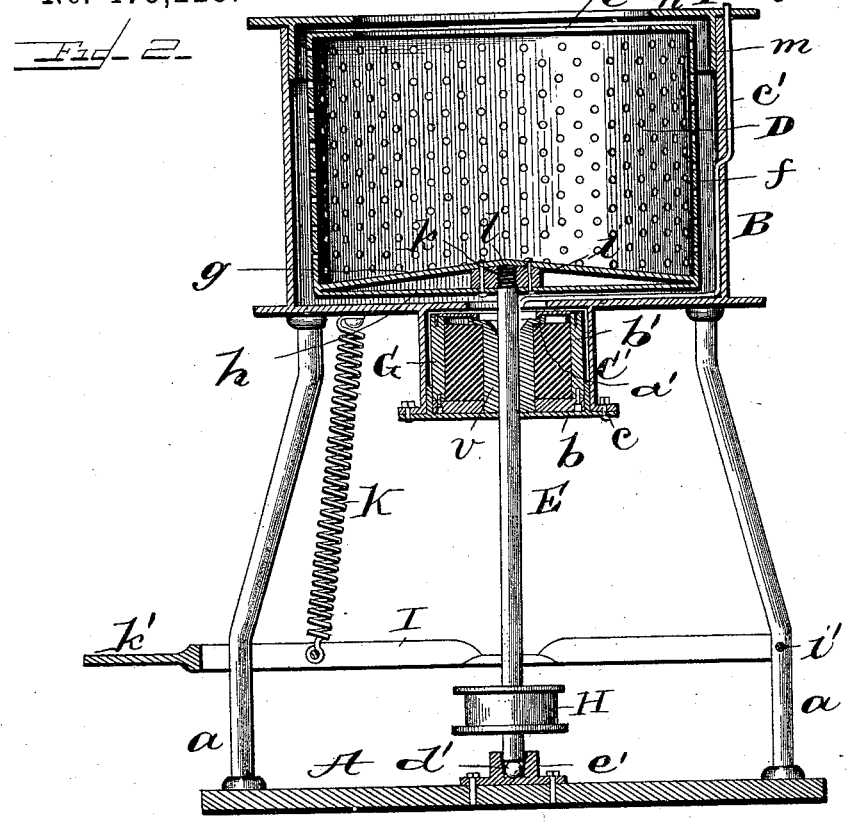
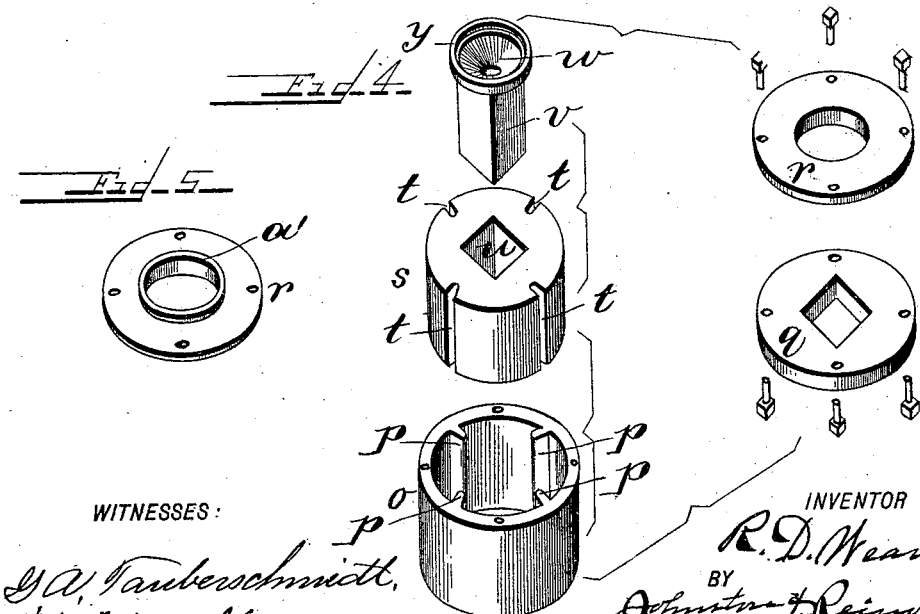
WITNESSES:
INVENTOR
R. D. Weaver
BY
Johnston & Reimohl
ATTORNEYS

UNITED STATES PATENT OFFICE.

ROBERT D. WEAVER, OF WASHINGTON, DISTRICT OF COLUMBIA.

CENTRIFUGAL MACHINE.

SPECIFICATION forming part of Letters Patent No. 475,225, dated May 17, 1892.

Application filed March 11, 1892. Serial No. 424,551. (No model.)

*To all whom it may concern:*

Be it known that I, ROBERT D. WEAVER, a citizen of the United States, residing at Washington, in the District of Columbia, have invented certain new and useful Improvements in Centrifugal Machines; and I do hereby declare the following to be a full, clear, and exact description of the invention, such as will enable others skilled in the art to which it appertains to make and use the same.

My invention relates to centrifugal machines, and has for its object certain improvements in construction, which will be fully disclosed in the following specification and claims.

Figure 1:
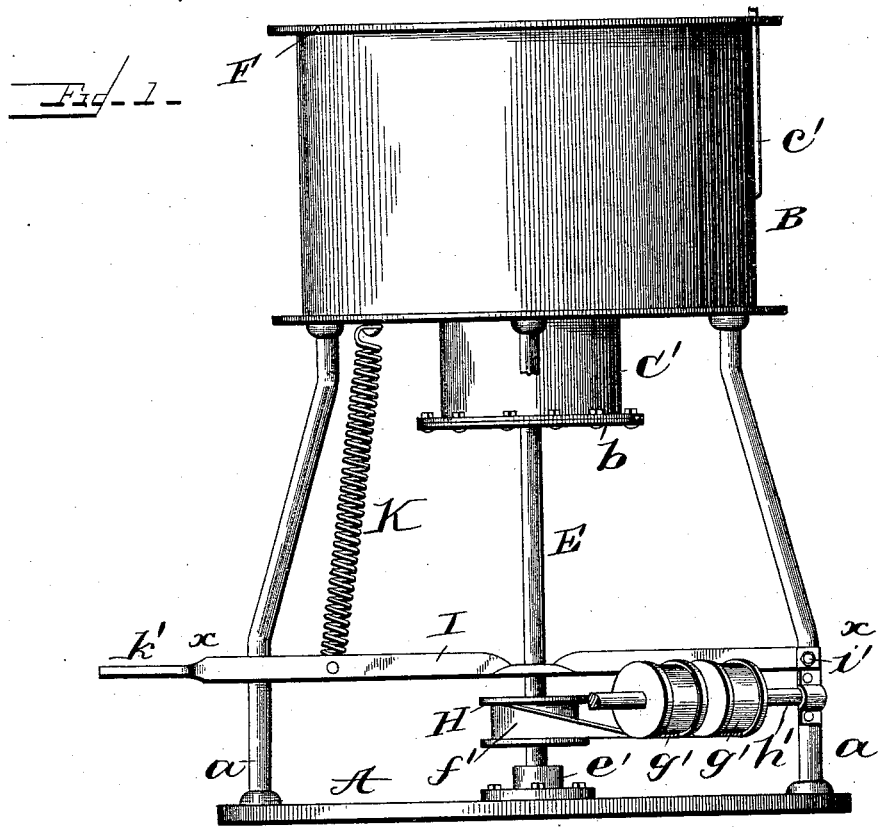
Figure 2:
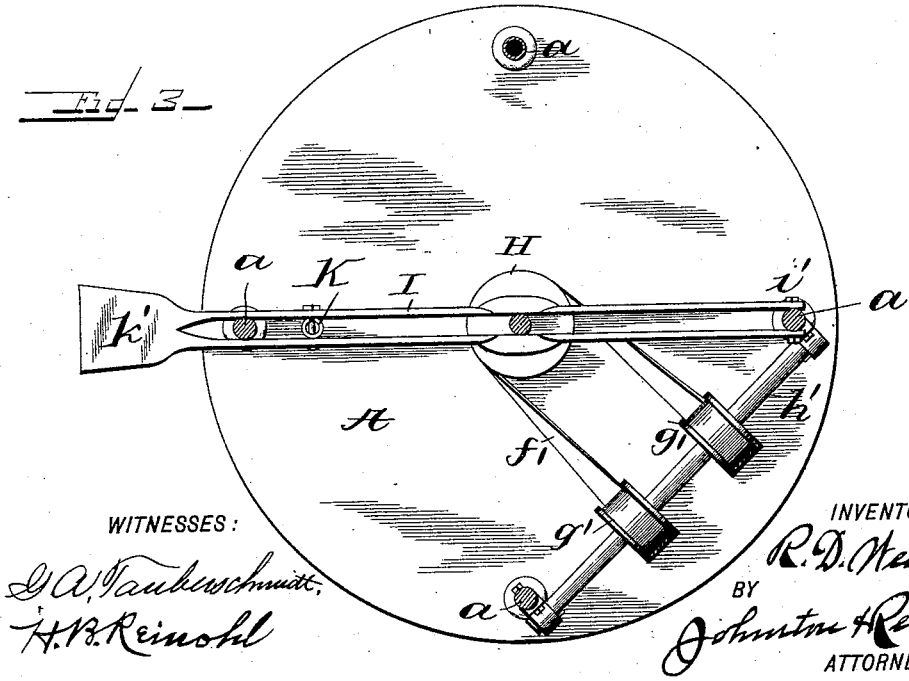

In the accompanying drawings, which form part of this specification, Figure 1 represents a side elevation; Fig. 2, a vertical section; Fig. 3, a plan view on the line $x$ $x$ in Fig. 1; Fig. 4, a detail perspective of the device for taking up or neutralizing the vibrations of the basket, and Fig. 5 an inverted perspective view of the cover of the cylinder containing the elastic cushion.

Reference being had to the drawings and the letters thereon, A indicates the base plate upon which the outer casing B is supported by legs $a$ $a$ $a$, either one of which may be hollow to conduct water from the said casing to the floor on which the machine rests. On the lower end of the casing B is an extension or supplemental chamber C, having a bottom $b$, detachably secured by bolts $c$ and in communication with the interior of the casing B through the opening $d$ in the bottom of said casing. Within the casing B is a basket D, having an open top $e$, a perforated side $f$, and an inclined inner bottom $g$ in the usual form of baskets used for removing water from washed clothes, and an outer flat bottom $h$, between which and the inner bottom $g$ is secured a disk $i$ by bolts or rivets passing through said bottoms and the disk, and said disk is provided with a screw-threaded aperture $k$, with which the upper and screw-threaded end $l$ of the shaft E engages. The screw-threads are cut in the disk and on the end of the shaft, so that the basket tends to run down on the screw-thread on the shaft as the basket revolves and render its becoming loose on the shaft impossible. Above the basket is a cover F to the casing B, which is provided with a vertical flange $m$ and a horizontal flange $n$, the latter extending inward over the upper part of the basket and preventing escape of water.

Machines of this kind are run at a very high rate of speed, and unless the greatest care is exercised to spread or distribute whatever may be put in the basket evenly when the basket is set in motion its contents will by centrifugal force adhere unevenly to the side of the basket and cause it to run very unevenly and produce a vibratory or wabbling motion of the basket, which results in wearing the journal and other bearings unevenly and is very destructive to the shaft. To compensate this vibratory motion of the basket and the shaft, springs have been attached to the lower end of the shaft and to some stationary portion of the machine usually to the legs, and elastic cushions have been applied to the shaft; but in none of these constructions has the evil been overcome, as in every instance the basket and the shaft upon which it is supported vibrate or wabble. It is my purpose to prevent this vibratory and wabbling motion of the basket and the shaft, and to effect this desirable result I place a device G in the supplemental chamber C to take up or neutralize the vibrations of the basket. The device consists of a metallic cylinder $o$, having ribs or splines $p$ on its inner surface, a bottom plate $q$, and a cover $r$, and within the cylinder $o$ is placed an elastic cushion $s$ of rubber or equivalent material, which is provided with grooves $t$ in its periphery, which engages the ribs $p$ and prevents it revolving with the shaft E, and in said cushion is an angular opening $u$ to receive a metallic sleeve $v$, preferably of brass, and through which the shaft E passes. The upper end of the sleeve $v$ is provided with a recess $w$ to form an oil-cup, and to prevent the oil coming in contact with the rubber cushion a vertical flange $y$ is formed around the recess $w$, and with which flange a corresponding depending flange $a'$ on the cover $r$ of the cylinder $o$ engages and forms a guard to said cushion.

When wet clothes or other articles or materials are put into the basket and distributed unevenly, any tendency to a vibratory or wabbling motion on the part of the basket is counteracted and taken up by the device G and the spring or cushion s before it is taken up by and conducted to the outer end of the shaft E.

The machine in practice requires no care in distributing the contents of the basket, and though unevenly distributed and run at a high rate of speed the basket revolves steadily and no vibratory motion thereof is perceptible, thus reducing the wear and tear of the machine to the minimum.

To supply a lubricant to the bearing in the sleeve $v$, a tube $c'$ is conducted through the wall of the casing B along its bottom and terminates above the recess or oil-cup $w$. The lower end of the shaft E rests upon a ball-bearing $d'$ in the step $e'$ to reduce friction, and upon the shaft E is secured a pulley H, by which the basket is revolved through the medium of a belt $f'$, driven by a suitable motor and run under idle-wheels $g'$ $g'$, supported on a shaft $h'$, secured to two of the legs $a$ $a$.

I is the brake, which consists of a bifurcated bar pivotally secured at $i'$ to one of the legs $a$, embracing the shaft E above the pulley H, and one of the legs $a$, beyond which is a treadle or plate $k'$ to press the bar upon the upper surface of the pulley H, the two forming a broad frictional surface and arresting the momentum of the basket speedily. After the brake has been released it is returned to its normal position out of engagement with the pulley H by the resiliency of spring K. It will be observed that the sleeve $v$ is embedded in and entirely surrounded by the rubber cushion $s$, and any tendency of the shaft or basket to depart from its normal and proper alignment is instantly resisted by the cushion and the cylinder $o$, and the cushion forms an elastic core in said cylinder $o$.

Having thus fully described my invention, what I claim is—

1. In a centrifugal machine, a stationary outer casing having a vertical extension on its under side, and a revoluble basket, in combination with a resilient and elastic device for neutralizing the vibrations of the basket supported in said extension and adjacent to the casing.

2. In a centrifugal machine, a device for neutralizing the vibrations of the basket, consisting of a separate metallic cylinder, an elastic cushion within and filling said cylinder, and a sleeve embedded in and entirely surrounded by the cushion, in combination with a fixed outer casing having a chamber on its under side, the wall of which incloses said metallic cylinder.

3. A centrifugal machine having a stationary outer casing provided with a chamber on its under side having a removable bottom, in combination with a device for neutralizing the vibrations of the basket supported in said chamber, a revoluble basket, and a shaft passing through said neutralizing device.

4. In a centrifugal machine, a device for neutralizing the vibrations of the basket, consisting of a metallic cylinder, a sleeve for the shaft of the basket, provided with a recess in its upper end and a vertical flange surrounding the recess, and an elastic cushion between said cylinder and sleeve.

5. In a centrifugal machine, a device for neutralizing the vibrations of a revoluble basket, consisting of a cylinder having ribs on its inner surface, an elastic cushion provided with grooves in its periphery, and a sleeve embedded in said cushion.

In testimony whereof I affix my signature in presence of two witnesses.

ROBERT D. WEAVER.

Witnesses:
D. C. REINOHL,
H. B. REINOHL.